United States Patent
Fillion et al.

(10) Patent No.: US 9,033,078 B2
(45) Date of Patent: May 19, 2015

(54) SYSTEM FOR CONNECTING A POWER-SUPPLY BATTERY OF A MOTOR VEHICLE

(75) Inventors: Thierry Fillion, Bazemont (FR); Jean-Yves Faure, Versailles (FR); Stephane Trentin, Viry Chatillon (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 0 days.

(21) Appl. No.: 14/002,277

(22) PCT Filed: Mar. 1, 2012

(86) PCT No.: PCT/FR2012/000073
§ 371 (c)(1),
(2), (4) Date: Oct. 22, 2013

(87) PCT Pub. No.: WO2012/117173
PCT Pub. Date: Sep. 7, 2012

(65) Prior Publication Data
US 2014/0060944 A1   Mar. 6, 2014

(30) Foreign Application Priority Data

Mar. 1, 2011   (FR) .................................... 11 51629

(51) Int. Cl.
*B60R 16/04* (2006.01)
*H01M 10/663* (2014.01)
(Continued)

(52) U.S. Cl.
CPC ...... *H01M 10/5095* (2013.01); *Y10T 29/49815* (2015.01); *Y10T 29/49826* (2015.01); *B60K 1/04* (2013.01); *B60K 2001/005* (2013.01); *B60K 2001/0438* (2013.01); *B60K 2001/0455* (2013.01); *B60K 2001/0472* (2013.01);
(Continued)

(58) Field of Classification Search
CPC ............. B60K 6/28; B60K 2001/0433; B60K 2001/0438; B60R 16/04
USPC .................................................. 180/68.1, 68.5
See application file for complete search history.

(56) References Cited

U.S. PATENT DOCUMENTS 5,392,873 A * 2/1995 Masuyama et al. .......... 180/68.5
5,432,026 A    7/1995 Sahm et al.
(Continued)

FOREIGN PATENT DOCUMENTS

DE            94 12 219 U1   11/1995
DE    10 2007 032 210 A1   10/2008
(Continued)

OTHER PUBLICATIONS

French Preliminary Search Report issued Oct. 20, 2011 in French Patent Application No. 1151629 (with English Translation of Category of cited Documents).
(Continued)

*Primary Examiner* — Jeffrey J Restifo
(74) *Attorney, Agent, or Firm* — Oblon, McClelland, Maier & Neustadt, L.L.P.

(57) ABSTRACT

A system for connecting a power-supply battery to a motor vehicle, including a device for ventilating the battery, and a multi-connection plate which includes openings for connecting to at least two ducts for circulating a heat-transport fluid, and for connecting to the battery so as to connect the at least two ducts to an inner circulation circuit of the battery.

15 Claims, 4 Drawing Sheets

(51) Int. Cl.
*B60K 1/04* (2006.01)
*B60L 3/00* (2006.01)
*B60L 11/18* (2006.01)
*H01M 10/613* (2014.01)
*H01M 10/625* (2014.01)
*H01M 10/6552* (2014.01)
*B60K 11/06* (2006.01)
*H01M 2/10* (2006.01)
*B60K 1/00* (2006.01)
*B60K 11/02* (2006.01)

(52) U.S. Cl.
CPC .......... *B60L3/0046* (2013.01); *B60L 11/1822* (2013.01); *B60L 11/1874* (2013.01); *B60L 11/1877* (2013.01); *B60L 11/1879* (2013.01); *H01M 10/5004* (2013.01); *H01M 10/5016* (2013.01); *H01M 10/5048* (2013.01); *H01M 2220/20* (2013.01); *B60K 11/02* (2013.01); *Y02T 10/7005* (2013.01); *Y02T 10/705* (2013.01); *Y02T 10/7072* (2013.01); *Y02T 90/124* (2013.01); *Y02T 90/14* (2013.01); *B60K 11/06* (2013.01); *H01M 2/10* (2013.01)

(56) References Cited

U.S. PATENT DOCUMENTS

| | | | |
|---|---|---|---|
| 5,490,572 A * | 2/1996 | Tajiri et al. | 180/65.1 |
| 5,538,809 A | 7/1996 | Bittihn et al. | |
| 5,639,571 A * | 6/1997 | Waters et al. | 429/71 |
| 6,085,854 A * | 7/2000 | Nishikawa | 180/68.5 |
| 6,230,677 B1 * | 5/2001 | Setsuda | 123/184.21 |
| 6,315,069 B1 * | 11/2001 | Suba et al. | 180/68.5 |
| 6,457,542 B1 * | 10/2002 | Hosono et al. | 180/68.1 |
| 6,622,809 B2 * | 9/2003 | Takahashi | 180/68.5 |
| 6,632,560 B1 * | 10/2003 | Zhou et al. | 429/99 |
| 6,662,891 B2 * | 12/2003 | Misu et al. | 180/68.1 |
| 7,013,659 B2 * | 3/2006 | Yoshida et al. | 62/186 |
| 7,401,669 B2 * | 7/2008 | Fujii et al. | 180/65.1 |
| 7,631,711 B2 * | 12/2009 | Kubo | 180/68.1 |
| 7,635,040 B2 * | 12/2009 | Seo et al. | 180/68.1 |
| 7,654,351 B2 * | 2/2010 | Koike et al. | 180/68.5 |
| 7,678,494 B2 * | 3/2010 | Tsuchiya | 429/120 |
| 7,810,596 B2 * | 10/2010 | Tsuchiya | 180/68.5 |
| 7,819,215 B2 * | 10/2010 | Tsuchiya | 180/68.5 |
| 7,997,368 B2 * | 8/2011 | Takasaki et al. | 180/68.5 |
| 8,016,063 B2 * | 9/2011 | Tsuchiya | 180/68.5 |
| 8,430,194 B2 * | 4/2013 | Yamatani | 180/68.1 |
| 8,556,017 B2 * | 10/2013 | Kubota et al. | 180/68.5 |
| 8,662,226 B2 * | 3/2014 | Varns et al. | 180/68.5 |
| 8,695,742 B2 * | 4/2014 | Fujita et al. | 180/89.1 |
| 8,717,761 B2 * | 5/2014 | Aoki et al. | 361/692 |
| 8,770,331 B2 * | 7/2014 | Lim et al. | 180/68.5 |
| 2009/0197154 A1 * | 8/2009 | Takasaki et al. | 429/83 |
| 2010/0145717 A1 | 6/2010 | Hoeltzel | |
| 2013/0140101 A1 * | 6/2013 | Lim et al. | 180/68.5 |
| 2013/0298586 A1 * | 11/2013 | Hwang et al. | 62/239 |
| 2014/0060944 A1 * | 3/2014 | Fillion et al. | 180/65.31 |
| 2014/0246259 A1 * | 9/2014 | Yamamura et al. | 180/68.5 |

FOREIGN PATENT DOCUMENTS

| | | |
|---|---|---|
| EP | 0 616 913 A2 | 9/1994 |
| EP | 0 780 915 A1 | 6/1997 |
| WO | WO 2010/064614 A1 | 6/2010 |

OTHER PUBLICATIONS

International Search Report issued Jun. 14, 2012 in PCT/FR2012/000073.

* cited by examiner

SYSTEM FOR CONNECTING A POWER-SUPPLY BATTERY OF A MOTOR VEHICLE

BACKGROUND

The present invention relates to a system for connecting an energy container of the battery type to an electric motor vehicle. Hereinafter, the term "battery" will be used by reason of simplification. The invention also relates to a motor vehicle as such comprising a battery attached by such a connection system to the motor vehicle. Finally, the invention also relates to a system and method for replacing a battery or any energy container of a motor vehicle including such a battery-connection system and to a battery-replacement station using such a system.

Certain motor vehicles, such as electric or hybrid vehicles, comprise a battery for powering an electric drive motor. The connection of such a battery to the motor vehicle is complex because it is necessary notably to provide an electric connection but also a connection of a system for ventilating or cooling the battery, which tends to heat up considerably during its various phases of use.

Furthermore, according to a worthwhile solution of the prior art, provision is made to exchange this battery when its energy level is low against a new, charged battery. This can be done in a station similar to a service station in which it is possible to fill a gasoline tank of a motor vehicle provided with a heat-engine drive train.

Document US 2010/0145717 discloses a station for exchanging an electric battery for powering a drive motor of an electric vehicle and a method for carrying out such an exchange. In the exchange station described, the driver positions his vehicle on a platform and movable means for removing the electric battery and for assembling the new battery to the vehicle carry out the exchange of the battery from beneath the vehicle. The battery is mechanically attached to the vehicle by means of a casing. This document does not however specify how the electric connection is achieved nor how ventilation of the battery would be applied.

One difficulty for putting in place such a concept of battery exchange lies in the fact that there is a multitude of motor vehicles that may comprise batteries of different types, fastened in a different manner to the motor vehicle. Therefore it is not economically conceivable to multiply the automatic devices for removing and replacing these various types of batteries nor to put in place a manual solution because of the cost and the weight of the batteries.

Thus, to make possible an easy deployment of the battery-exchange stations (requiring little technological competence), it is necessary to make the operation of these stations and the method of battery exchange used reliable, robust, flexible and universal.

More generally, it is necessary to provide a battery-connection system on a motor vehicle that makes possible the electric connection and the formation of a system for ventilating the battery, thus making it possible to deliver the energy necessary in an optimal manner to the vehicle when it is on the move while ensuring sufficient cooling of the battery in all its phases of use, including charging phases. Moreover, it is worthwhile to provide a battery-connection system that is compatible with a considerable number of battery installation and removal operations.

BRIEF SUMMARY

The object of the invention is therefore to supply a solution for connecting a battery to a motor vehicle which allows the optimal operation of the battery during its configuration for attachment to the motor vehicle while allowing it to be easily installed and replaced, achieving the objectives mentioned above.

Accordingly, the invention is based on a connection system between a power-supply battery and a motor vehicle comprising a device for ventilating the battery, characterized in that it comprises a multiconnection plate which comprises openings, on the one hand for a connection with at least two ducts for the circulation of a coolant, and, on the other hand, for a connection with the battery so as to link these at least two ducts to an internal circulation circuit of the battery.

The connection system between a power-supply battery and a motor vehicle may comprise three ducts substantially aligned in a transverse direction toward the rear of the battery, including one central cold duct suitable for an inlet of a coolant and two lateral hot ducts suitable for an outlet of the coolant.

The ducts for the circulation of a coolant may be attached to a first upper surface of the multiconnection plate, itself attached beneath the floor of a motor vehicle.

The battery may comprise an upper surface comprising openings surrounded by seals arranged to correspond with the openings of the multiconnection plate and allow the connection of the ducts for the circulation of a coolant with an internal circulation circuit of the battery.

The connection system between a power-supply battery and a motor vehicle may comprise a lateral flat surface linked to the battery and a lateral surface linked to the floor of the motor vehicle, said surfaces being provided for a connection by fastening elements.

The multiconnection plate may be linked to the motor vehicle in a rear portion of the motor vehicle, at the second-row seating provided for the rear passengers of the motor vehicle.

The multi-connection plate may be attached to the floor of the motor vehicle by fastening elements delimiting a space above the upper surface of the multiconnection plate for the positioning of the ducts of a coolant and the fastening of ducts for a refrigerant.

The fastening elements may comprise elastic elements allowing a flexible connection to the floor of the motor vehicle in order to compensate for the dispersions of the connection system.

The connection system between a power-supply battery and a motor vehicle may comprise a socket extending toward the front of the battery comprising an electric connector interacting with a corresponding electric connector attached to the motor vehicle.

The system may be suitable for a connection/disconnection of the battery in a substantially vertical direction.

The invention also relates to a motor vehicle comprising a battery for powering a driving means, characterized in that it comprises a system for connecting its power-supply battery as described above.

The motor vehicle may comprise an air conditioner for cooling the passenger compartment of the motor vehicle and a separate air conditioner for cooling its power-supply battery.

The air conditioner for cooling its power-supply battery may be placed behind the power-supply battery and linked to the multiconnection plate by the coolant ducts.

The invention also relates to a method for installing/removing a battery on a motor vehicle, characterized in that it comprises the following steps:

relative movement in a substantially vertical direction of a battery relative to a lower surface linked to the motor vehicle, by a lifting device;

connection/disconnection of an electric connection between two connectors of respectively a socket linked to the vehicle and a top portion of electric connection linked to the motor vehicle;

connection/disconnection of a ventilation connection to the battery between an upper surface of the battery and a multiconnection plate of a connection system as described above serving as an interface between the battery and an air conditioner;

mechanical connection/disconnection of fastening elements for fastening the battery to the motor vehicle.

BRIEF DESCRIPTION OF THE DRAWINGS

These objects, features and advantages of the present invention will be explained in detail in the following description of a particular embodiment, which description is made in a nonlimiting manner with respect to the appended figures amongst which.

DETAILED DESCRIPTION

Figure 1:
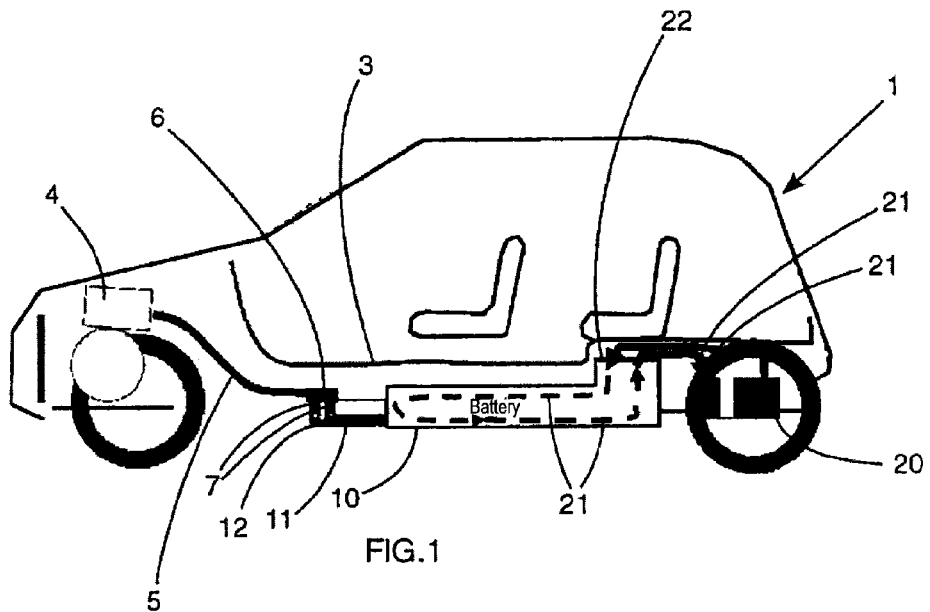
FIG. 1 represents a simplified side view in section of a motor vehicle of which the battery is linked to the vehicle by a connection system according to one embodiment of the invention.

FIG. 1 represents a motor vehicle 1 fitted with a battery 10 in a configuration of attachment to the motor vehicle, attached removably beneath the floor 3 thereof, in a relatively central zone. The motor vehicle 1 comprises an electric driving means 4, linked by an electric connection 5 to the battery 10. In order to allow the attachment of the battery 10, a particular connection system is provided, comprising notably on the one hand a connection at a ventilation device for the cooling of the battery and, on the other hand, an electric connection to allow the powering of the driving means 4 of the motor vehicle.

Figure 2:
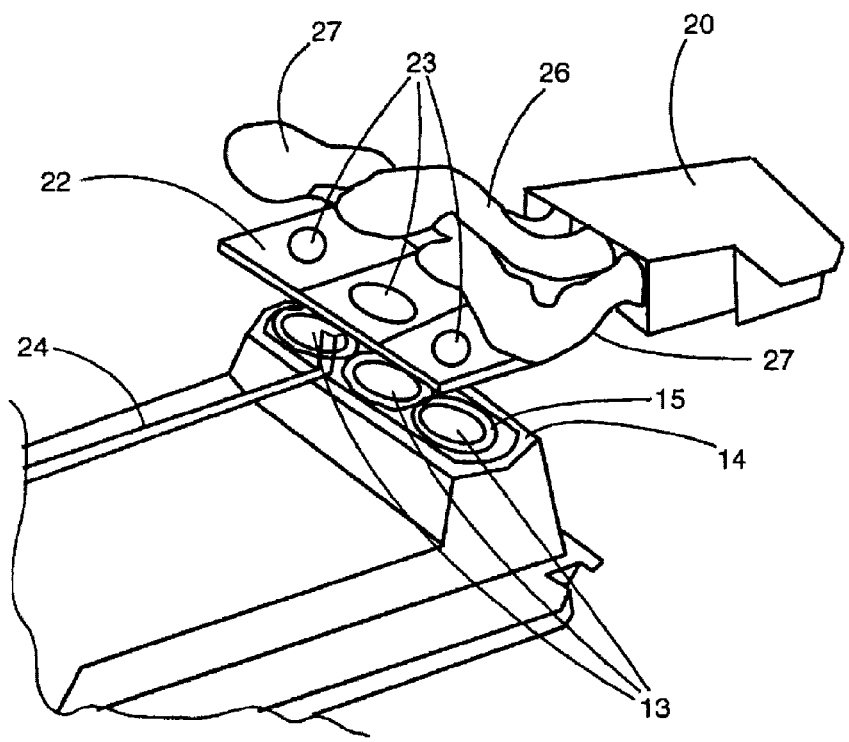
FIG. 2 represents an exploded view from above of a portion of the system for connecting a battery to a motor vehicle according to the embodiment of the invention.

According to the embodiment, the device for ventilating the battery 10 comprises an air conditioner 20 external to the battery 10, which comprises notably an evaporator and a fan in order to generate a flow of coolant 21, which is air in this embodiment, which fulfills a cooling function by passing through the internal volume of the battery 10. The battery connection system makes it possible to form the battery ventilation device which comprises a portion inside the battery and a portion outside, attached to the motor vehicle. This connection system comprises a multiconnection plate 22, placed between the battery 10 and the air conditioner 20 and serving as an interface, which is particularly visible in FIG. 2, which comprises three openings 23 placed substantially in one and the same plane and substantially aligned in a direction transverse to the motor vehicle, in order to receive three ducts 26, 27 originating from the air conditioner 20 and in order to position their ends in one and the same plane, and allow them to be connected to an upper flat surface 14 in the rear portion of the casing of the battery 10, which comprises corresponding openings 13 surrounded by fixed seals 15, in order finally to be able to close the coolant circulation circuit.

Figure 3:
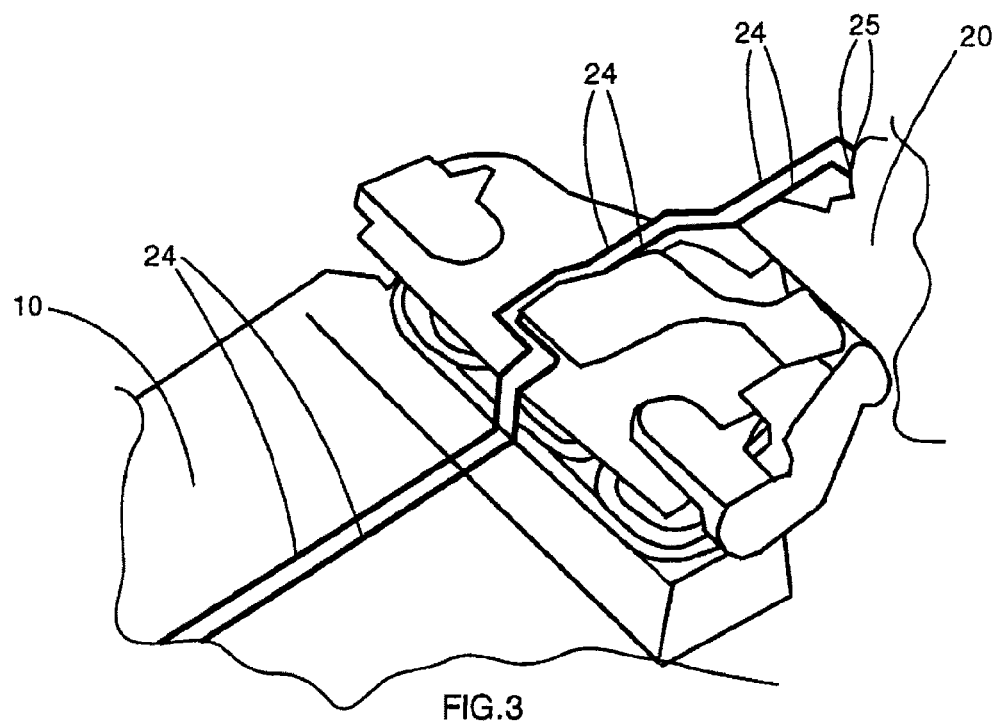
FIG. 3 represents a view from above of a portion of the system for connecting a battery to a motor vehicle according to the embodiment of the invention.

This coolant circuit is a closed circuit dedicated to the cooling of the battery. The coolant is cooled at the air conditioner 20 using a refrigerant supplied by pipes 24 which travel along a portion of the surface beneath the floor 3 of the vehicle, and are then attached to the upper surface of the multiconnection plate 22 in order finally to rejoin the air conditioner 20 at connections 25, as can be seen in FIG. 3.

The circuit for cooling the battery first of all comprises a cold duct 26 for carrying the cold coolant from the air conditioner 20 to the battery 10. This cold duct 26 is attached in the central zone of the multiconnection plate 22. Then, the cooling circuit comprises two hot ducts 27, attached to the lateral zones of the multiconnection plate 22, which carry away the coolant that has been heated during its journey within the battery, and return it to the air conditioner 20 to be cooled again within for example an evaporator. This ventilation system is therefore a dedicated and autonomous system comprising a specific coolant circulating in a closed circuit and cooled by a dedicated air conditioner 20, positioned in the rear portion beneath the floor 3 of the vehicle and separate from the air conditioner used for cooling the passenger compartment of the vehicle.

Figure 4:
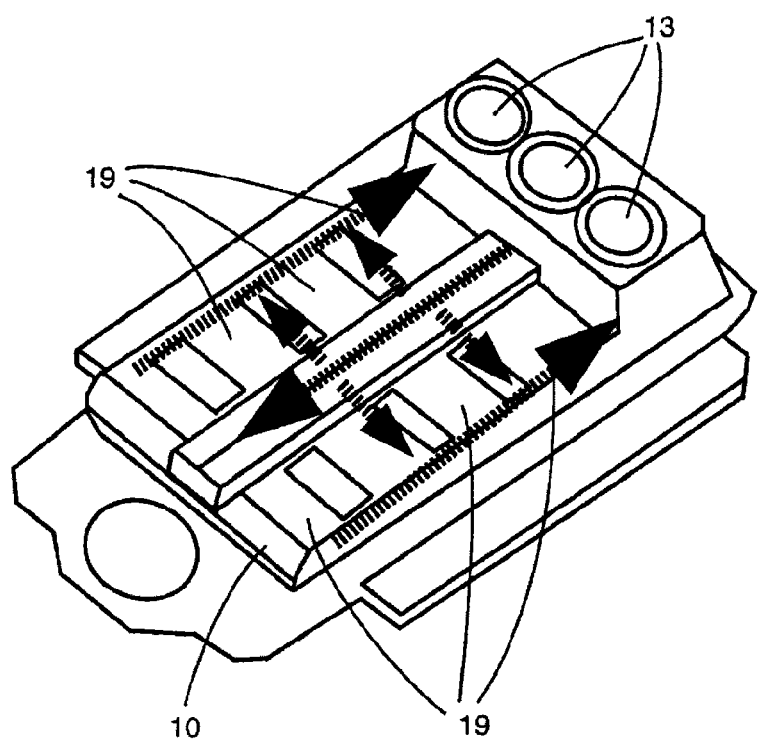
FIG. 4 represents a simplified view of the ventilation of the inside of a battery according to the embodiment of the invention.

FIG. 4 illustrates more precisely the flow of coolant 21 within the volume of the battery. It reaches this internal volume from the cold duct 26, hence through the central opening 13 of its upper surface so as to travel the whole length of the battery, in its central zone, from the rear to the front. A portion of this coolant escapes laterally during this longitudinal movement, in a lateral direction, and then returns to the longitudinal direction toward the rear at the two lateral portions of the battery until rejoining the lateral openings 13 intended for a connection with the lateral hot ducts 27. This therefore generates a flow of coolant 21 which, in the best way possible, travels over the various surfaces around the energy-generating cells 19 of the battery 10.

Figure 5:
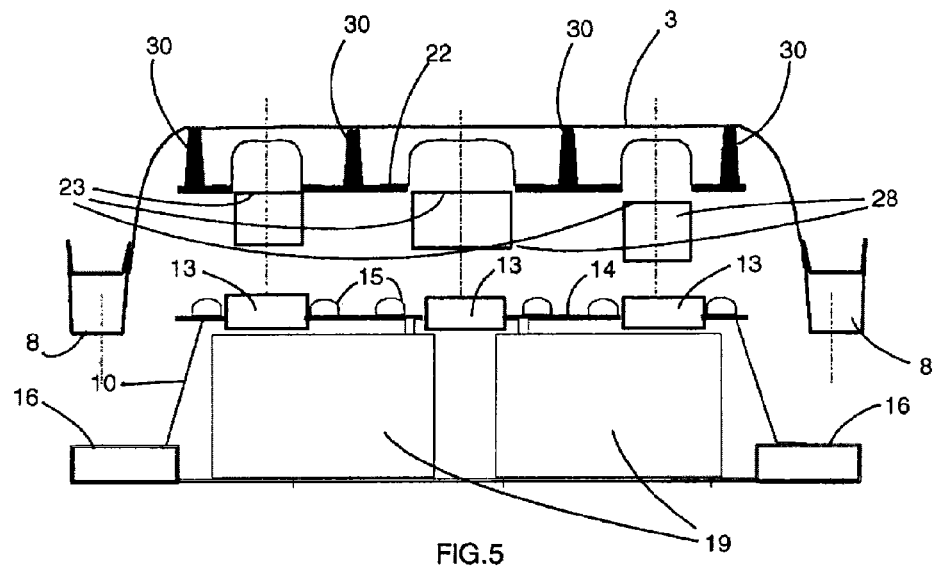
FIG. 5 represents a simplified view in cross section of a portion of the system for connecting a battery to a motor vehicle in an unattached configuration according to the embodiment of the invention.
Figure 6:
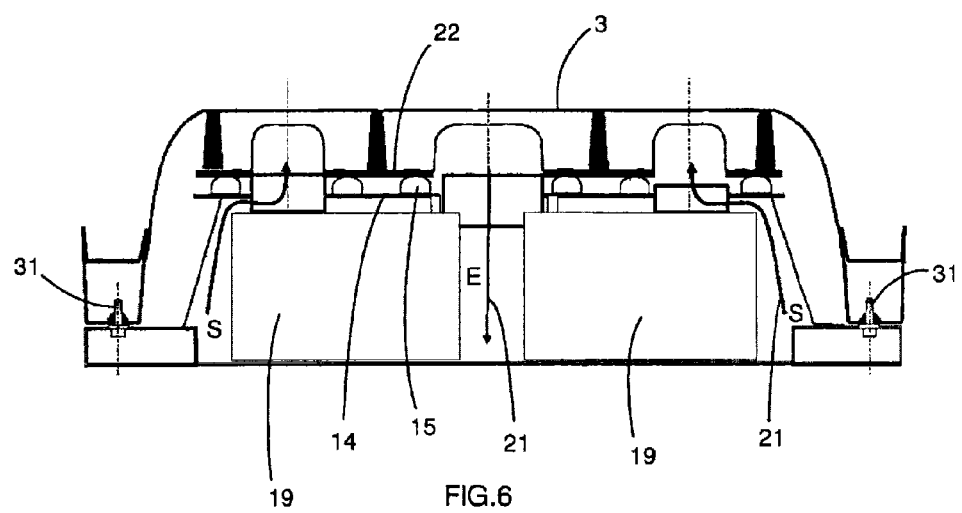
FIG. 6 represents a simplified view in cross section of a portion of the system for connecting a battery to a motor vehicle in attached configuration according to the embodiment of the invention.

The removable connection of the battery 10 on the motor vehicle is more precisely illustrated by FIGS. 5 and 6 representing cross sections at the multiconnection plate 22.

FIG. 5 illustrates a configuration in which the battery 10 is separated from the motor vehicle. The arrangement shows the floor of the motor vehicle 3, to which the multiconnection plate 22 is attached at the level of the second-row seating provided for the rear passengers, as appears in FIG. 1. The various cold ducts 26 and hot ducts 27 are attached to the upper surface of this plate, originating from the air conditioner, and are therefore included in the volume between the plate 22 and the floor 3 of the vehicle delimited by fastening elements 30. Extensions 28 of these ducts 26, 27 extend beyond the multiconnection plate 22 in a substantially vertical direction beneath this plate.

As a comment, the volume delimited by the upper surface of the multiconnection plate 22 and the floor 3 of the vehicle is used for the running and attachment of elements such as the pipes 24 for supplying the refrigerant, which have been mentioned above, and pipes for carrying a brake fluid, that are not shown.

The battery 10 comprises an upper surface 14 suitable for interacting with the multiconnection plate 22, which surface comprises openings 13 of which the dimensions and spacing correspond to the openings 23 of this plate 22. Seals 15 are arranged around these openings 13. Finally, the casing of the battery 10 comprises flat connecting portions 16 which extend laterally over the whole length of the two sides of the battery, at a lower height than that of the upper surface of the connection 14. The floor 3 of the motor vehicle comprises lateral surfaces 8, lower than the surface of the floor in its central zone, designed to interact with these flat lateral connecting surfaces 16.

FIG. 6 represents the configuration of attachment of the battery 10 beneath the floor 3 of the motor vehicle. In this configuration, the extensions 28 of the ducts 26, enter the openings 13 of the battery 10 in order to ensure a good circulation of the flow of coolant 21. In addition, the seals 15 press against the flat bottom surface of the multiconnection plate 22 ensuring that the connection is sealed.

It is therefore apparent that a flow of coolant 21 can enter the battery through the central opening 13 in the substantially vertical direction E, oriented downward, and then reemerge through the two lateral openings 13 in the substantially vertical direction S oriented upward. The coolant thus travels around the various energy-producing cells 19 of the battery and cools them. The two lateral surfaces 8, 16 of the motor vehicle and of the battery 10 are attached together by any means, for example screws 31.

Figure 7:
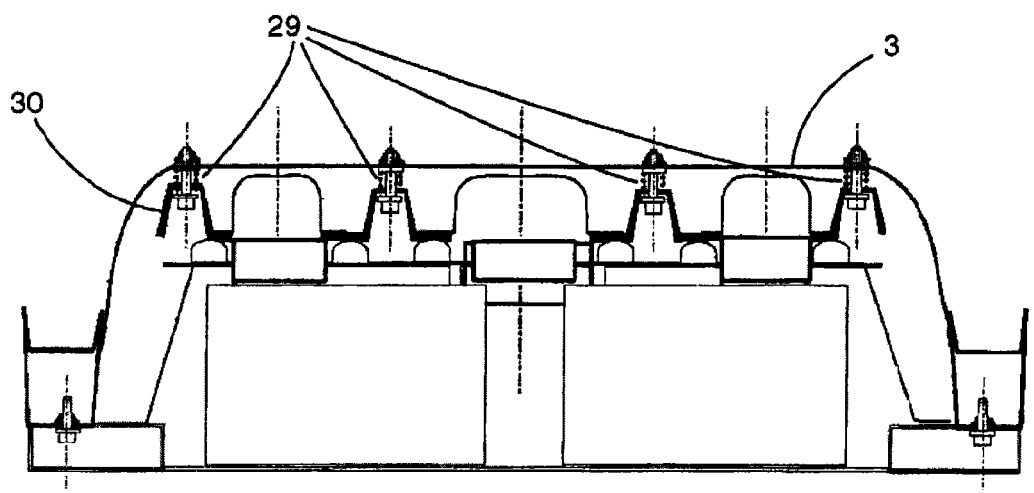
FIG. 7 represents a simplified view in cross section of a portion of the system for connecting the battery to the motor vehicle in attached configuration according to a variant of the embodiment of the invention.

FIG. 7 illustrates a variant embodiment in which the multiconnection plate 22 is attached flexibly to the floor 3 of the motor vehicle by means of elastic connecting elements 29 such as springs in order to absorb the geometric dispersions of the various components of the connection system, and allow a precise connection. For this, the springs act in compression on the interconnection plate 22 in order to ensure its contact over the whole of its surface with the upper flat surface 14 of the battery.

The system for connecting the battery 10 to the motor vehicle also makes it possible to establish an electric connection 5 between the battery 10 and the motor vehicle 1, and particularly its electric driving means 4. This electric connection 5 may for example comprise two high-tension cables and one low-tension cable.

The arrangement of the electric connection that can be seen in FIG. 1 rests on a first portion linked to the battery 10 and taking the form of a rigid socket 11 made of metal, very rigid plastic or of hybrid material comprising a mixture of metal and plastic, notably a plastic comprising an internal mesh made of metal, extending horizontally toward the front of the battery 10. This socket 11 comprises an electric connector 12. Then, the electric connection arrangement of the battery comprises a second top portion linked to the motor vehicle and interacting with the socket 10, which comprises an electric connector 6 and the end of the electric connection 5 of the motor vehicle, designed to interact with the electric connector 12 of the socket 10. In this embodiment, the electric connector 6 is a high-tension connector comprising one or more male pins 7 and the electric connector 12 on the socket 11 comprises the corresponding female portion.

The arrangement described above of a battery 10 beneath a motor vehicle is removable and designed for a rapid, automated exchange in a substantially vertical movement of the battery. Finally, this connection system between the battery and the motor vehicle also has the following advantages:

it ensures that the connection is sealed, because water, mud or dust would damage the battery, and prevents leaks of coolant from the ventilation system;

it allows the simultaneous connection without particular locking of several ducts of the ventilation device, in zones that are not very accessible;

it provides resistance against all the other attacks such as chip spreading;

it is suitable for a very irregular cycle of installation/removal operations which may extend from a few hours to several months;

it is suitable for many battery installation/removal operations, of the order of several thousand;

it allows a rapid operation of installation or removal of a battery, of the order of a few minutes;

it is suitable for all vehicles and takes account of the dispersions, tolerances of geometry of the various components of the motor vehicle and of the system itself.

The invention also relates to a method for installing/removing a battery on a motor vehicle, which comprises the following essential steps:

relative movement in a substantially vertical direction of a battery 10 relative to a lower surface 3 linked to the motor vehicle, by a lifting device;

connection/disconnection of an electric connection between two connectors 12, 6 of respectively a socket 11 linked to the vehicle and a top portion of electric connection linked to the motor vehicle;

connection/disconnection of a ventilation connection 13; 26, 27 to the battery 10 between an upper surface of the battery 14 and a multiconnection plate 22 serving as an interface between the battery and an air conditioner 20;

mechanical connection/disconnection of fastening elements 31 for fastening the battery 10 to the motor vehicle.

The invention also relates to a system for replacing a battery and a replacement station using such a system, which comprises a device for lifting and optionally moving a battery and a tool for the mechanical attachment and release of a battery on a motor vehicle, while making the electric and ventilation connection via a connection arrangement as described above. It is possible to provide a lifting system that is not fitted with a movement function and is limited only to the lifting function, that is to say to the substantially vertical movement of the battery. The movement function will then be obtained by a separate movement system that can either move the battery to be installed or the vehicle on which it is desired to install the battery. For this, conveyor rails may be provided for movements in a horizontal direction for the purpose of bringing the battery under a motor vehicle in line vertically with its future position. The mechanical attachment and release of the battery can be carried out by any connection means, in an automated manner, by a robot or a device of universal toolbox type, comprising connection interfaces and motorized means for implementing the actuation of attachment and release tools.

Naturally, the invention is not limited to the embodiment described above and it is apparent that many other architectures can be envisaged. As a variant, the battery 10 could be attached in a different housing beneath the motor vehicle. Moreover, the ventilation device could have another geometry. The air conditioner might not be dedicated but be that which is also used for the heat control of the passenger compartment for example. Similarly, the coolant may be of any kind, and not necessarily dedicated to the battery but may be used to interact with other components of the motor vehicle.

Moreover, the multiconnection plate may take other forms, and comprise numbers of connections other than the three shown, at least two.

Finally, the solution has been illustrated for the situation of a battery attached removably beneath a motor vehicle, designed for multiple installation and removal operations in order to allow its replacement when it is fully discharged. However, it remains suitable for the fixed, nonremovable, batteries designed to remain permanently in their housing within the motor vehicle and of which the recharging is provided directly on the motor vehicle. The solution has the advantage of making the attachment of the battery easier on production lines and of making the subsequent maintenance and repair operations easier.

The invention claimed is:

1. A connection system between a power-supply battery and a motor vehicle comprising:
   a device for ventilating the battery;
   three ducts substantially aligned in a transverse direction toward a rear of the battery, including one central cold duct configured as an inlet of a coolant and two lateral hot ducts configured as an outlet of the coolant; and
   a multiconnection plate which comprises openings for a connection with the ducts for circulation of a coolant, and for a connection with the battery to link the ducts to an internal circulation circuit of the battery.

2. The connection system between a power-supply battery and a motor vehicle as claimed in claim 1, wherein the ducts for the circulation of a coolant are attached to a first upper surface of the multiconnection plate, itself the multiconnection plate being attached beneath a floor of a motor vehicle.

3. The connection system between a power-supply battery and a motor vehicle as claimed in claim 2, wherein the battery comprises an upper surface comprising openings surrounded by seals configured to correspond with the openings of the multiconnection plate and to allow the connection of the ducts for the circulation of a coolant with the internal circulation circuit of the battery.

4. The connection system between a power-supply battery and a motor vehicle as claimed in claim 1, further comprising a lateral flat surface linked to the battery and a lateral surface linked to a floor of the motor vehicle, the surfaces provided for a connection by fastening elements.

5. The connection system between a power-supply battery and a motor vehicle as claimed in claim 1, wherein the multiconnection plate is linked to the motor vehicle in a rear portion of the motor vehicle, at a second-row seating provided for rear passengers of the motor vehicle.

6. The connection system between a power-supply battery and a motor vehicle as claimed in claim 1, wherein the multiconnection plate is attached to a floor of the motor vehicle by fastening elements delimiting a space above an upper surface of the multiconnection plate for positioning of the ducts of a coolant and fastening of ducts for a refrigerant.

7. The connection system between a power-supply battery and a motor vehicle as claimed in claim 6, wherein the fastening elements comprise elastic elements allowing a flexible connection to the floor of the motor vehicle to compensate for dispersions of the connection system.

8. The connection system between a power-supply battery and a motor vehicle as claimed in claim 1, further comprising a socket extending toward a front of the battery comprising an electric connector interacting with a corresponding electric connector attached to the motor vehicle.

9. The connection system between a power-supply battery and a motor vehicle as claimed in claim 1, configured for a connection/disconnection of the battery in a substantially vertical direction.

10. A motor vehicle comprising:
    a battery for powering a driving means; and
    the connection system as claimed in claim 1.

11. The motor vehicle as claimed in claim 10, further comprising an air conditioner for cooling a passenger compartment of the motor vehicle and a separate air conditioner for cooling the battery.

12. The motor vehicle as claimed in claim 11, wherein the air conditioner for cooling the battery is placed behind the battery and is linked to the multiconnection plate by the ducts.

13. The connection system between a power-supply battery and a motor vehicle as claimed in claim 1, wherein the device for ventilating the battery includes an air conditioner external to the battery.

14. The connection system between a power-supply battery and a motor vehicle as claimed in claim 13, wherein the ducts are connected to the air conditioner.

15. A method for installing/removing a battery on a motor vehicle, comprising:
    moving, in a substantially vertical direction, a battery relative to a lower surface linked to the motor vehicle, by a lifting device;
    connecting/disconnecting an electric connection between two connectors of respectively a socket linked to the vehicle and a top portion of electric connection linked to the motor vehicle;
    connecting/disconnecting a ventilation connection to the battery between an upper surface of the battery and a multiconnection plate of a connection system serving as an interface between the battery and an air conditioner, the connection system including three ducts substantially aligned in a transverse direction toward a rear of the battery and connected to the multiconnection plate, the ducts including one central cold duct configured as an inlet of a coolant to the battery and two lateral hot ducts configured as an outlet of the coolant from the battery; and
    mechanically connecting/disconnecting fastening elements for fastening the battery to the motor vehicle.

* * * * *